(12) United States Patent
Hashimoto et al.

(10) Patent No.: US 11,654,890 B2
(45) Date of Patent: *May 23, 2023

(54) VEHICLE CONTROL DATA GENERATION METHOD, VEHICLE CONTROLLER, VEHICLE CONTROL SYSTEM, AND VEHICLE LEARNING DEVICE

(71) Applicant: TOYOTA JIDOSHA KABUSHIKI KAISHA, Toyota (JP)

(72) Inventors: Yosuke Hashimoto, Nagakute (JP); Akihiro Katayama, Toyota (JP); Yuta Oshiro, Nagoya (JP); Kazuki Sugie, Toyota (JP); Naoya Oka, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 214 days.

This patent is subject to a terminal disclaimer.

(21) Appl. No.: 17/158,066

(22) Filed: Jan. 26, 2021

(65) Prior Publication Data

US 2021/0253086 A1    Aug. 19, 2021

(30) Foreign Application Priority Data

Feb. 17, 2020 (JP) .............................. JP2020-024221

(51) Int. Cl.
*B60W 20/40* (2016.01)
*B60W 20/20* (2016.01)
(Continued)

(52) U.S. Cl.
CPC ............ *B60W 20/40* (2013.01); *B60W 20/20* (2013.01); *B60W 30/18009* (2013.01); *G01C 21/3469* (2013.01); *G01C 21/3804* (2020.08)

(58) Field of Classification Search
CPC .............. B60W 20/40; B60W 20/20; B60W 30/18009; G01C 21/3804; G01C 21/3469
See application file for complete search history.

(56) References Cited

U.S. PATENT DOCUMENTS 6,487,477 B1 * 11/2002 Woestman ............ B60W 10/08
340/439
7,954,579 B2 * 6/2011 Rodriguez ............ B60W 10/06
180/65.265
(Continued)

FOREIGN PATENT DOCUMENTS

JP         2016-6327 A       1/2016

OTHER PUBLICATIONS

Notice of Allowance issued in U.S. Appl. No. 17/160,487 dated Jan. 31, 2022.

*Primary Examiner* — Jeff A Burke
*Assistant Examiner* — Jerrod Irvin Davis
(74) *Attorney, Agent, or Firm* — Oblon, McClelland, Maier & Neustadt, L.L.P.

(57) ABSTRACT

A vehicle control data generation method includes causing processing circuitry to execute an obtaining process that obtains a state of a vehicle and a specifying variable, an operating process that operates an electronic device, a reward calculating process that provides a greater reward when a characteristic of the vehicle meets a standard than when the characteristic does not meet the standard, an updating process that updates relationship defining data. The update map outputs the updated relationship defining data so as to increase an expected return for the reward in a case where the electronic device is operated in accordance with the relationship defining data. The reward calculating process includes a changing process that changes the reward between when the characteristic of the vehicle is a predetermined characteristic in an EV mode and when the characteristic is the predetermined characteristic in a HV mode.

7 Claims, 10 Drawing Sheets

(51) Int. Cl.
*G01C 21/34* (2006.01)
*G01C 21/00* (2006.01)
*B60W 30/18* (2012.01)

(56) References Cited

U.S. PATENT DOCUMENTS

2021/0024054 A1* 1/2021 Song .................... F02D 41/2464
2021/0179062 A1* 6/2021 Lee ..................... B60W 30/188

* cited by examiner

VEHICLE CONTROL DATA GENERATION METHOD, VEHICLE CONTROLLER, VEHICLE CONTROL SYSTEM, AND VEHICLE LEARNING DEVICE

FIELD

The present disclosure relates to a vehicle control data generation method, a vehicle controller, a vehicle control system, and a vehicle learning device.

DESCRIPTION OF RELATED ART

Japanese Laid-Open Patent Publication No. 2016-6327 discloses an example of a controller that controls a throttle valve based on a value obtained by processing the operation amount of an accelerator pedal with a filter. The throttle valve is an example of operation units of an internal combustion engine mounted on a vehicle.

The above-described filter needs to be configured to set the operation amount of the throttle valve of the internal combustion engine mounted on the vehicle to an appropriate operation amount in correspondence with the operation amount of the accelerator pedal. Thus, setting the filter requires a great number of man-hours by skilled workers. In this manner, setting operation amounts or the like of electronic devices in a vehicle in correspondence with the state of the vehicle requires a great number of man-hours by skilled workers.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Examples of the present disclosure will now be described.

Example 1: A vehicle control data generation method is provided. A memory device stores relationship defining data that defines a relationship between a state of a vehicle including a rotating electric machine and an internal combustion engine and an action variable related to operation of an electronic device in the vehicle. The generation method includes causing processing circuitry to execute an obtaining process that obtains a specifying variable specifying whether an electric vehicle (EV) mode or a hybrid vehicle (HV) mode is being executed, the electric vehicle mode generating a state of the vehicle obtained based on a detection value of a sensor and generating a propelling force of the vehicle through only torque of the rotating electric machine, the hybrid vehicle mode causing torque of the internal combustion engine to contribute to the generation of the propelling force, an operating process that operates the electronic device, a reward calculating process that provides, based on the state of the vehicle obtained by the obtaining process, a greater reward when a characteristic of the vehicle meets a standard than when the characteristic of the vehicle does not meet the standard, and an updating process that updates the relationship defining data by inputting, to a predetermined update map, the state of the vehicle obtained by the obtaining process, a value of the action variable used to operate the electronic device, and the reward corresponding to the operation of the electronic device. The update map outputs the updated relationship defining data so as to increase an expected return for the reward in a case where the electronic device is operated in accordance with the relationship defining data. The reward calculating process includes a changing process that changes a reward provided when the electric vehicle mode is being executed and the characteristic of the vehicle is a predetermined characteristic such that the provided reward differs from a reward provided when the hybrid vehicle mode is being executed the characteristic of the vehicle is the predetermined characteristic.

In the above-described method, by calculating the reward that results from the operation of the electronic device, it is possible to understand what kind of reward is obtained by the operation. Updating the relationship defining data in accordance with the update map conforming to reinforcement learning allows the relationship between the state of the vehicle and the action variable to be suitable. Accordingly, the man-hours by skilled workers are reduced when the relationship between the state of the vehicle and the action variable is set to be appropriate.

The request for the characteristic of the vehicle may be different between the EV mode and the HV mode. The above-described method changes the manner of providing a reward between the EV mode and the HV mode. Thus, the relationship defining data that allows the intended characteristic to be obtained can be learned in each mode through reinforcement learning.

Example 2: In the vehicle control data generation method according to Example 1, the reward calculating process includes a process that provides a greater reward when an energy use efficiency is high than when the energy use efficiency is low. The changing process includes a process that changes the reward such that increasing the energy use efficiency is more advantageous to obtain a great reward in the electric vehicle mode than in the hybrid vehicle mode.

In the above-described method, the relationship defining data suitable for executing control that increases the energy use efficiency in the EV mode can be learned through reinforcement learning. This increases the travel distance in the EV mode.

Example 3: The vehicle control data generation method according to Example 1 or 2 further includes causing the processing circuitry to execute a process that generates control map data, based on the relationship defining data updated by the updating process, by associating the state of the vehicle with the value of the action variable that maximizes the expected return, the control map data using the state of the vehicle as an input and outputting the value of the action variable that maximizes the expected return.

In the above-described method, the control mapping data is generated based on the relationship defining data that has been learned through reinforcement learning. Thus, the implementation of the control map data in the controller allows the value of the action variable that maximizes the expected return to be easily set based on the state of the vehicle and the action variable.

Example 4: A controller for a vehicle including a rotating electric machine and an internal combustion engine is provided. The controller includes a memory device configured to store relationship defining data that defines a relationship between a state of the vehicle and an action variable related to operation of an electronic device in the vehicle and includes processing circuitry. The processing circuitry is configured to execute an obtaining process that obtains a specifying variable specifying whether an electric vehicle mode or a hybrid vehicle mode is being executed, the electric vehicle mode generating a state of the vehicle obtained based on a detection value of a sensor and generating a propelling force of the vehicle through only torque of the rotating electric machine, the hybrid vehicle mode causing torque of the internal combustion engine to contribute to the generation of the propelling force, an operating process that operates the electronic device, a reward calculating process that provides, based on the state of the vehicle obtained by the obtaining process, a greater reward when a characteristic of the vehicle meets a standard than when the characteristic of the vehicle does not meet the standard, and an updating process that updates the relationship defining data by inputting, to a predetermined update map, the state of the vehicle obtained by the obtaining process, a value of the action variable used to operate the electronic device, and the reward corresponding to the operation of the electronic device. The update map outputs the updated relationship defining data so as to increase an expected return for the reward in a case where the electronic device is operated in accordance with the relationship defining data. The reward calculating process includes a changing process that changes a reward provided when the electric vehicle mode is being executed and the characteristic of the vehicle is a predetermined characteristic such that the provided reward differs from a reward provided when the hybrid vehicle mode is being executed the characteristic of the vehicle is the predetermined characteristic. The operating process includes a process that operates, based on the relationship defining data, the electronic device in accordance with the value of the action variable corresponding to the state of vehicle.

In the above-described configuration, the relationship defining data learned through reinforcement learning is used to set the value of the action variable. By operating the electronic device based on that value, it is possible to operate the electronic device such that the expected return increases.

Example 5: A control system for a vehicle including a rotating electric machine and an internal combustion engine is provided. The control system includes a memory device configured to store relationship defining data that defines a relationship between a state of the vehicle and an action variable related to operation of an electronic device in the vehicle and includes processing circuitry. The processing circuitry is configured to execute an obtaining process that obtains a specifying variable specifying whether an electric vehicle mode or a hybrid vehicle mode is being executed, the electric vehicle mode generating a state of the vehicle obtained based on a detection value of a sensor and generating a propelling force of the vehicle through only torque of the rotating electric machine, the hybrid vehicle mode causing torque of the internal combustion engine to contribute to the generation of the propelling force, an operating process that operates the electronic device, a reward calculating process that provides, based on the state of the vehicle obtained by the obtaining process, a greater reward when a characteristic of the vehicle meets a standard than when the characteristic of the vehicle does not meet the standard, and an updating process that updates the relationship defining data by inputting, to a predetermined update map, the state of the vehicle obtained by the obtaining process, a value of the action variable used to operate the electronic device, and the reward corresponding to the operation of the electronic device. The update map outputs the updated relationship defining data so as to increase an expected return for the reward in a case where the electronic device is operated in accordance with the relationship defining data. The reward calculating process includes a changing process that changes a reward provided when the electric vehicle mode is being executed and the characteristic of the vehicle is a predetermined characteristic such that the provided reward differs from a reward provided when the hybrid vehicle mode is being executed the characteristic of the vehicle is the predetermined characteristic. The operating process includes a process that operates, based on the relationship defining data, the electronic device in accordance with the value of the action variable corresponding to the state of vehicle. The processing circuitry includes a first processing circuitry mounted on the vehicle and a second processing circuitry that differs from an in-vehicle device. The first processing circuitry is configured to execute at least the obtaining process and the operating process. The second processing circuitry is configured to execute at least the updating process.

In the above-described configuration, the second processing circuitry executes the updating process. Thus, as compared with when the first processing circuitry executes the updating process, the computation load on the first execution device is reduced.

The phrase "second processing circuitry differs from an in-vehicle device" means that the second processing circuitry is not an in-vehicle device.

Example 6: A vehicle controller including the first processing circuitry of the vehicle control system according to Example 5 is provided.

Example 7: A vehicle learning device including the second processing circuitry of the vehicle control system according to Example 5 is provided.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

A vehicle control data generation method, a vehicle controller, a vehicle control system, and a vehicle learning device according to embodiments will now be described with reference to the drawings.

First Embodiment

Figure 1:
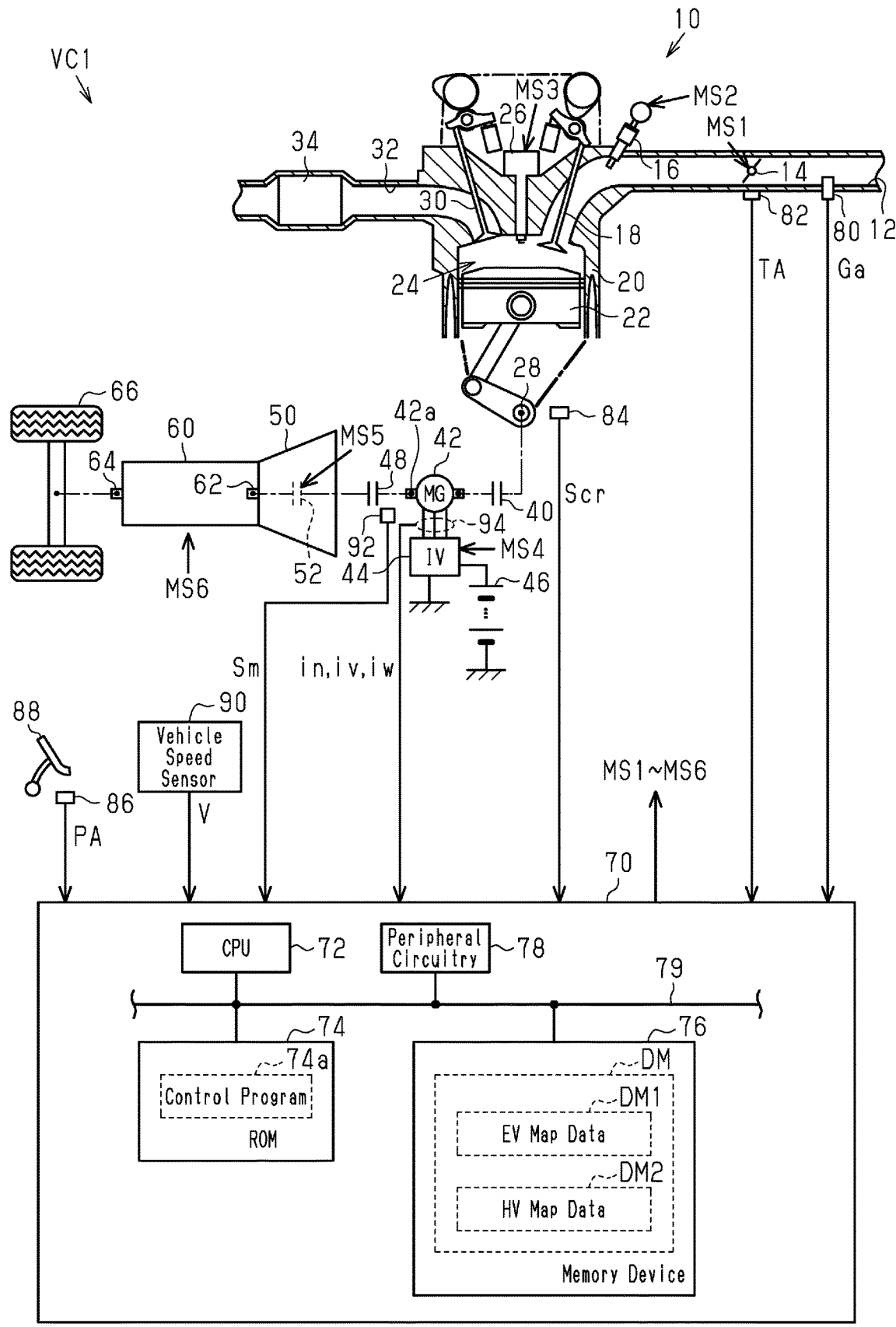
FIG. 1 is a diagram showing a controller and a drive system according to a first embodiment.

FIG. 1 shows the configuration of a drive system and a controller 70 of a vehicle VC1 according to the present embodiment.

As shown in FIG. 1, an internal combustion engine 10 includes an intake passage 12, which is provided with a throttle valve 14 and a fuel injection valve 16 sequentially from the upstream side. The air drawn into the intake passage 12 and the fuel injected from the fuel injection valve 16 flow into a combustion chamber 24, which is defined by a cylinder 20 and a piston 22, as an intake valve 18 opens. In the combustion chamber 24, the air-fuel mixture of fuel and air is burned by spark discharge of the ignition device 26. The energy generated by the combustion is converted into rotation energy of a crankshaft 28 by the piston 22. The burned air-fuel mixture is discharged to an exhaust passage 32 as exhaust gas when an exhaust valve 30 is opened. The exhaust passage 32 is provided with a catalyst 34, which is an aftertreatment device for purifying exhaust gas.

A rotary shaft 42a of a motor generator 42 is mechanically couplable to the crankshaft 28 via a clutch 40. The motor generator 42 includes multiple terminals. The terminal voltage at a battery 46, which is a direct-current voltage source, is converted into alternating-current voltage by an inverter 44 and applied to each of the terminals.

An input shaft 62 of a transmission 60 is mechanically couplable to the rotary shaft 42a via a clutch 48 and a torque converter 50, which includes a lockup clutch 52. The transmission 60 varies a gear ratio, which is the ratio of the rotation speed of the input shaft 62 and the rotation speed of an output shaft 64. Driven wheels 66 are mechanically coupled to the output shaft 64.

The controller 70 controls the internal combustion engine 10. Specifically, the controller 70 controls operation units of the internal combustion engine 10 in order to control the controlled variables of the internal combustion engine 10 (for example, torque and exhaust component ratio). Examples of the operation units include the throttle valve 14, the fuel injection valve 16, and the ignition device 26. The controller 70 controls the motor generator 42. Specifically, the controller 70 operates the inverter 44 in order to control, for example, the torque and rotation speed of the motor generator 42. The controller 70 controls the torque converter 50. Specifically, the controller 70 operates the lockup clutch 52 to control an engagement state of the lockup clutch 52. Further, the controller 70 controls the transmission 60. Specifically, the controller 70 operates the transmission 60 in order to control the controlled variables of the transmission 60 (for example, gear ratio). FIG. 1 shows operation signals MS1 to MS8, which respectively correspond to the throttle valve 14, the fuel injection valve 16, the ignition device 26, the inverter 44, the lockup clutch 52, the transmission 60, the clutch 40, the clutch 48.

To control the controlled variables, the controller 70 refers to, for example, an intake air amount Ga, which is detected by an air flow meter 80, an opening degree of the throttle valve 14, which is detected by a throttle sensor 82 (throttle opening degree TA), and an output signal Scr of a crank angle sensor 84. The controller 70 refers to a depression amount of an accelerator pedal 88 (accelerator operation amount PA), which is detected by an accelerator sensor 86 and a vehicle speed Vs, which is detected by a vehicle speed sensor 90. Further, the controller 70 refers to an output signal Sm of a rotation angle sensor 92, which detects a rotation angle of the rotary shaft 42a, and currents iu, iv, iw, which are detected by a current sensor 94 and flow through the motor generator 42.

The controller 70 executes a hybrid vehicle (HV) mode and an electric vehicle (EV) mode. The HV mode sets the clutches 40, 48 to engaged states, transmits the power of the internal combustion engine 10 to the driven wheels 66, and uses the torque of the internal combustion engine 10 to generate the propelling force of the vehicle VC1. The EV mode sets the clutch 40 to a disengaged state and uses only the torque of the motor generator 42 to generate the propelling force of the vehicle VC1. In the HV mode, the controller 70 transmits the power of the internal combustion engine 10 and the power of the motor generator 42 to the driven wheels 66 at a distribution ratio that has been defined in advance in correspondence with the power requested for the vehicle VC1.

The controller 70 includes a CPU 72, a ROM 74, a memory device 76, and peripheral circuitry 78, which can communicate with one another via a local network 79. The peripheral circuitry 78 includes a circuit that generates a clock signal regulating internal operations, a power supply circuit, and a reset circuit. The memory device 76 is, for example, an electrically-rewriteable nonvolatile memory.

The ROM 74 stores a control program 74a. The control program 74a commands the execution of control while the internal combustion engine 10 is running. The memory device 76 stores map data DM, which includes the current gear ratio GR, the vehicle speed Vs, and the accelerator operation amount PA as input variables and includes a command value of the gear ratio GR (gear ratio command value GR*) as an output variable. The map data DM includes EV map data DM1, which is used for the EV mode, and HV map data DM2, which is used for the HV mode. The map data refers to a data set of discrete values of the input variables and values of the output variables each corresponding to a value of the input variable.

Figure 2:
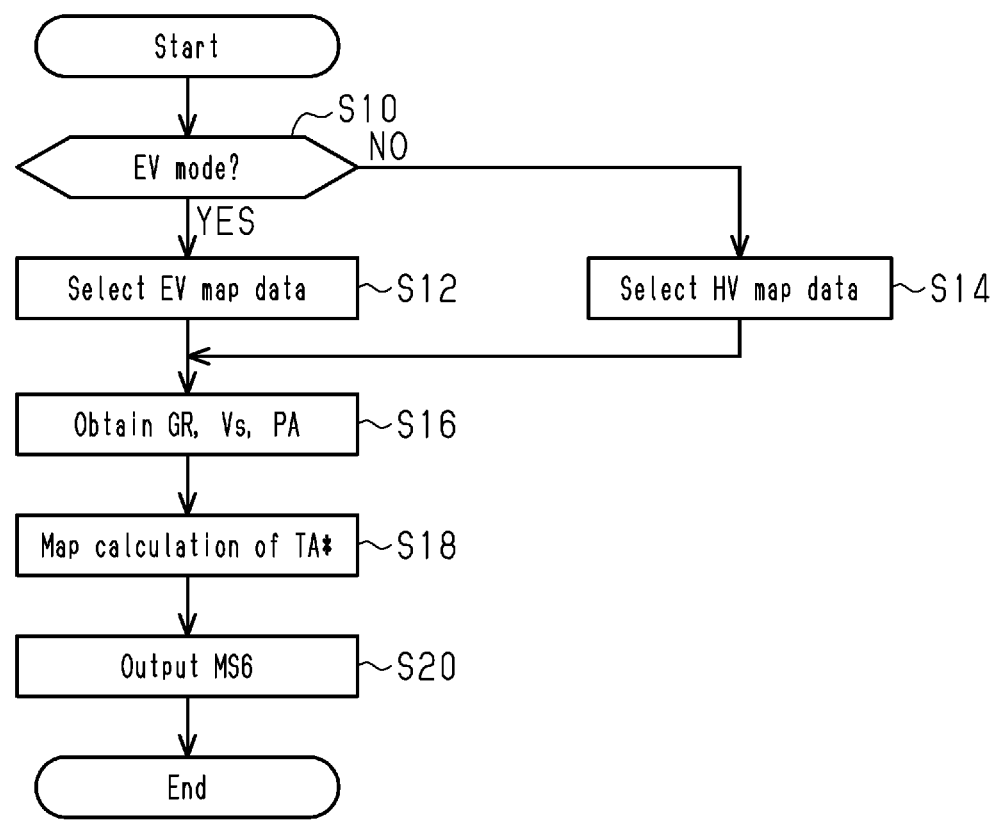
FIG. 2 is a flowchart illustrating a procedure for processes executed by the controller in FIG. 1.

FIG. 2 shows a procedure for processes executed by the controller 70 of the present embodiment. The processes shown in FIG. 2 are executed by the CPU 72 repeatedly executing the control program 74a stored in the ROM 74 in a predetermined cycle on condition that, for example, the internal combustion engine 10 is in a running state. In the following description, the number of each step is represented by the letter S followed by a numeral.

In a series of processes shown in FIG. 2, the CPU 72 first determines whether the EV mode is being executed (S10). When determining that the EV mode is being executed (S12: YES), the CPU 72 selects the EV map data DM1 (S12). When determining that the HV mode is being executed (S12: NO), the CPU 72 selects the HV map data DM2 (S14).

When the process of S12 or S14 is completed, the CPU 72 obtains the accelerator operation amount PA, the current gear ratio GR, and the vehicle speed Vs (S16). Then, the CPU 72 uses the selected one of the EV map data DM1 and the HV map data DM2 to obtain the gear ratio command value GR* through map calculation (S18). When the value of an input variable matches any of the values of the input variables on the map data, the map calculation uses the value of the corresponding output variable on the map data. When the value of the input variable does not match any of the values of the input variables on the map data, the map calculation uses a value obtained by interpolation of multiple values of the output variable included in the map data as the calculation result. Next, the CPU 72 outputs the operation signal MS6 to the transmission 60 to control the gear ratio (S20).

When the process of step S20 is completed, the CPU 72 suspends the series of processes shown in FIG. 2.

Figure 3:
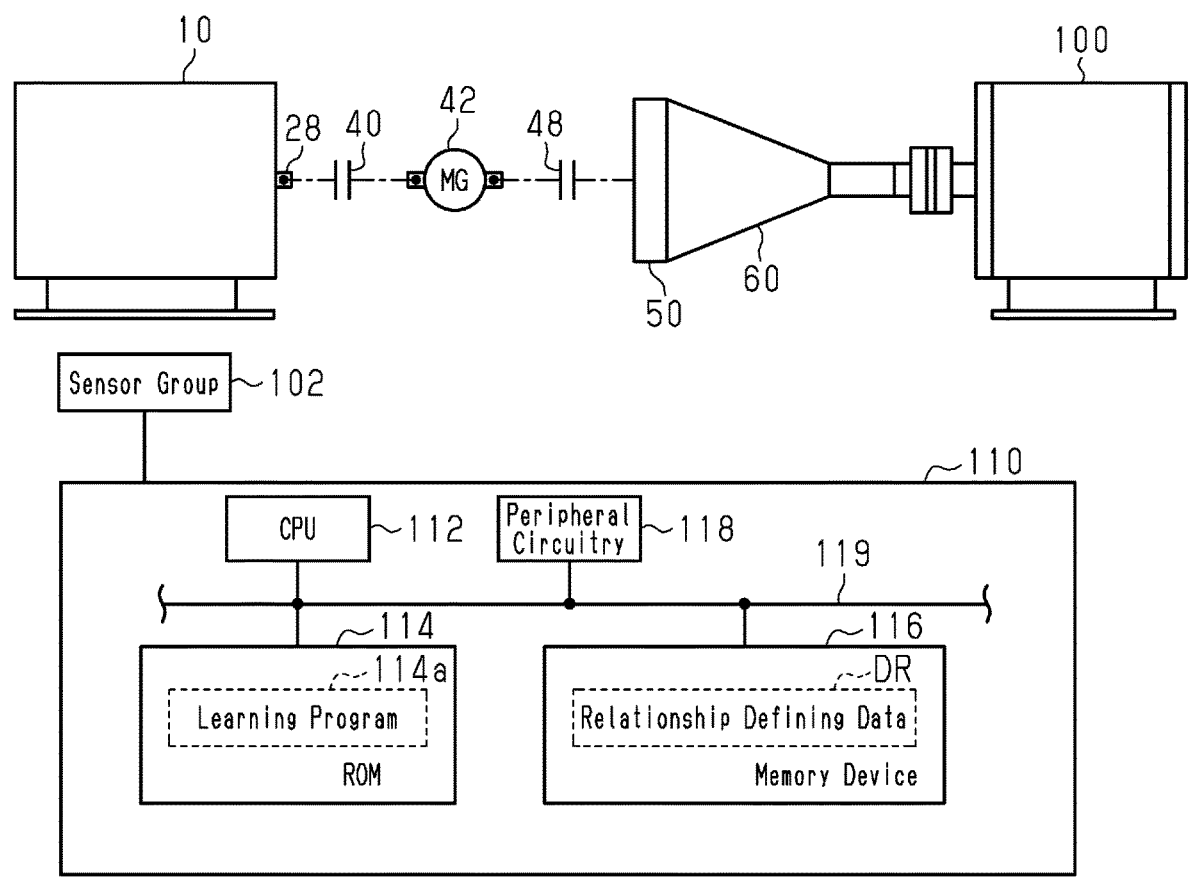
FIG. 3 is a diagram showing a system that generates the map data according to the first embodiment.

FIG. 3 shows a system that generates the map data DM.

As shown in FIG. 3, the crankshaft 28 of the internal combustion engine 10 is mechanically couplable to the motor generator 42 via the clutch 40. A dynamometer 100 is mechanically couplable to the clutch 48, the torque converter 50, and the transmission 60. Various state variables that occur when the internal combustion engine 10 and the motor generator 42 are operated are detected by a sensor group 102. The detection results are input to a generation device 110, which is a computer that generates the map data DM. The sensor group 102 includes one or more sensors mounted on the vehicle VC1, which is shown in FIG. 1.

The generation device 110 includes a CPU 112, a ROM 114, and peripheral circuitry 118, which can communicate with each other via a local network 119. The memory device 116 is, for example, an electrically-rewriteable nonvolatile memory. The memory device 116 stores relationship defining data DR. The relationship defining data DR defines the relationship between a state variable and an action variable. The state variable includes the accelerator operation amount PA, the vehicle speed Vs, and the gear ratio GR. The action variable includes the gear ratio command value GR*. The ROM 114 stores a learning program 114a, which learns the relationship defining data DR through reinforcement learning.

Figure 4:
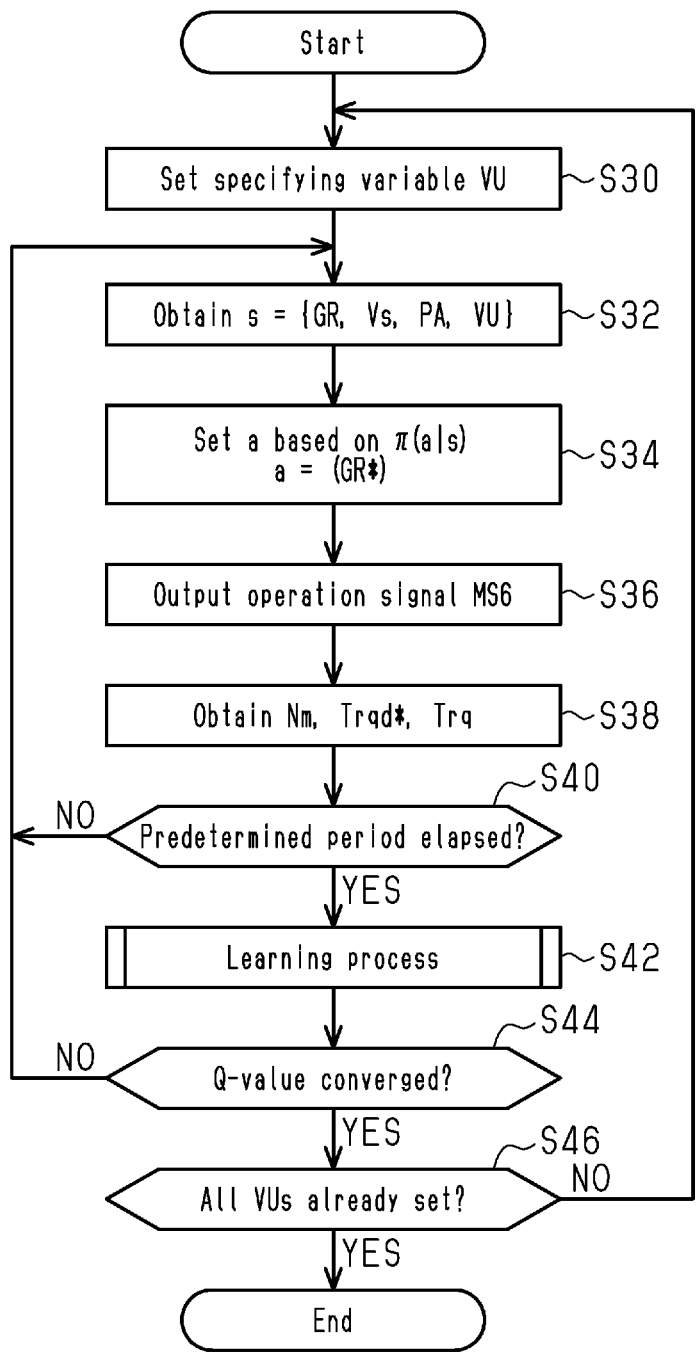
FIG. 4 is a flowchart illustrating a procedure for processes executed by the system according to the first embodiment.

FIG. 4 shows a procedure for processes executed by the generation device 110. The process shown in FIG. 4 is implemented by the CPU 112 executing the learning program 114a stored in the ROM 114.

In the series of processes shown in FIG. 4, the CPU 112 first sets the value of a specifying variable VU (S30). Next, the CPU 112 sets (obtains), as the state s, the accelerator operation amount PA, the current gear ratio GR, the vehicle speed Vs, and the specifying variable VU (S32). The system in FIG. 3 does not include the accelerator pedal 88. Thus, the accelerator operation amount PA is virtually generated by the generation device 110 simulating the state of the vehicle VC1. The virtually-generated accelerator operation amount PA is regarded as a state of the vehicle that is based on the detection value of the sensor. The CPU 112 calculates the vehicle speed Vs as a traveling speed of the vehicle that can be obtained under the hypothesis that the vehicle actually exists. This vehicle speed is regarded as the state of the vehicle that is based on the detection value of the sensor. Specifically, the CPU 112 first calculates the rotation speed of an input shaft of the torque converter 50 using the output signal Sm of the rotation angle sensor 92. The CPU 112 calculates the vehicle speed Vs using the rotation speed and the gear ratio GR.

In accordance with a policy 7C defined by the relationship defining data DR, the CPU 112 sets an action a, which corresponds to the state s obtained through the process of S32 and is defined by the gear ratio command value GR* (S34).

The relationship defining data DR defines the policy π and an action value function Q. Specifically, the action value function Q is a table-type function representing values of expected return in accordance with dimensional independent variables including the state s and the action a. When the state s is provided, the action value function Q includes values of the action a at which the independent variable is the provided state s. Among these values, the one at which the expected return is maximized is referred to as a greedy action. The policy 7C defines rules with which the greedy action is preferentially selected, and an action a different from the greedy action is selected with a predetermined probability.

Specifically, the number of the values of the independent variables of the action value function Q is obtained by deleting a certain amount from all the possible combinations of the state s and the action a, referring to, for example human knowledge. That is, for example, in order for the gear ratio GR to avoid a sudden change from second gear to fourth gear, the gear ratio command value GR* serving as a possible action a is limited to first gear, second gear, and third gear when the current gear ratio GR is second gear. That is, when the gear ratio GR serving as the state s is second gear, the action a of fourth gear or higher is not defined.

Next, the CPU 112 outputs the operation signal MS6 based on the set gear ratio command value GR* (S36). Subsequently, the CPU 112 obtains a rotation speed Nm of the rotary shaft 42a, a torque Trq, which is input to the torque converter 50, and a requested torque command value Trqd* (S38). The requested torque command value Trqd* is a command value for the torque input to the torque converter 50 and is requested from the accelerator operation amount PA. The CPU 112 calculates the torque Trq based on the gear ratio of the transmission 60 and a load torque that is generated by the dynamometer 100. Further, the CPU 112 sets the requested torque command value Trqd* in correspondence with the accelerator operation amount PA and the gear ratio GR. The gear ratio command value GR* is an action variable of reinforcement learning. Thus, every time the internal combustion engine 10 and the motor generator 42 are operated, the gear ratio command value GR* does not necessarily have to set the requested torque command value Trqd* to be less than or equal to the maximum torque, which is achievable by at least one of the internal combustion engine 10 and the motor generator 42. Further, every time the internal combustion engine 10 and the motor generator 42 are operated, the requested torque command value Trqd* does not necessarily have to be less than or equal to the value of the maximum torque, which is achievable by at least one of the internal combustion engine 10 and the motor generator 42.

Next, the CPU 112 determines whether a predetermined period has elapsed from the later one of the point in time at which the process of S30 was executed and the point in time at which the process of S42 (described later) was executed (S40). The predetermined period simply needs to be the following period (a) or (b).

(a) A period during which the absolute value of the change amount of the accelerator operation amount PA becomes a first predetermined value and then becomes a second predetermined value, which is smaller than the first predetermined value, and a period of time having a predetermined length has elapsed.

(b) A period during which the absolute value of the change amount of the accelerator operation amount PA becomes greater than or equal to the first predetermined value.

Even in the middle of the period defined by (a) or (b), when the mode being executed is switched from one of the EV mode and the HV mode to the other one, that point in time is set as a start point or an end point of the predetermined period.

Then, when determining that the predetermined period has elapsed (S40: YES), the CPU 112 updates the action value function Q through reinforcement learning (S42).

Figure 5:
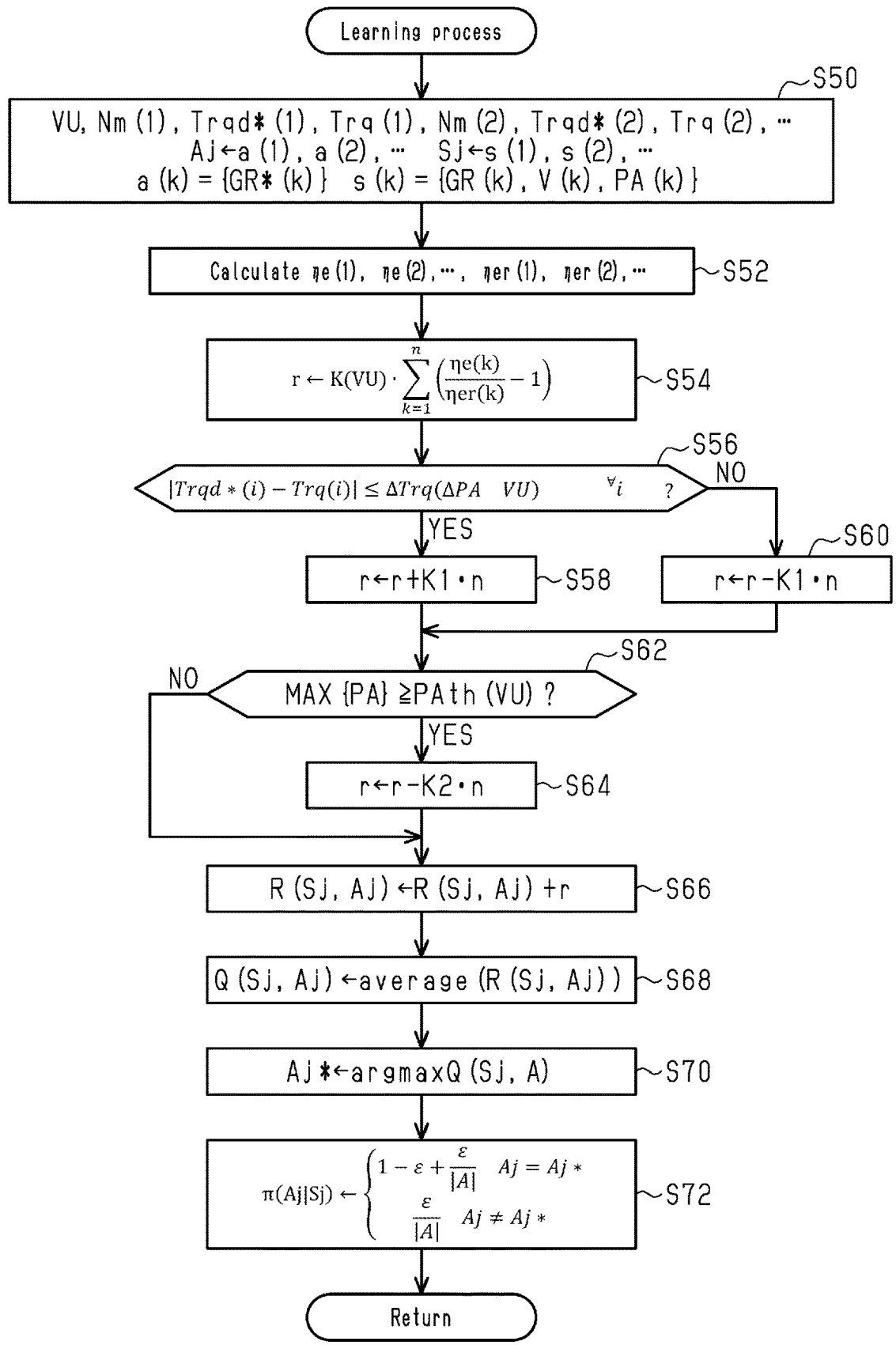
FIG. 5 is a flowchart illustrating the details of a learning process according to the first embodiment.

FIG. 5 illustrates the details of the process of S42.

In a series of processes shown in FIG. 5, the CPU 112 obtains time-series data including groups of three sampled values of the rotation speed Nm, the requested torque command value Trqd*, and the torque Trq in the predetermined period, time-series data of the state s, time-series data of the action a, and the specifying variable VU (S50). In FIG. 5, multiple different numbers in parentheses indicate the values of the variables obtained at different sampling points in time. For example, a requested torque command value Trqd* (1) and a requested torque command value Trqd* (2) have been obtained at different sampling points in time. The time-series data of the action a in the predetermined period is defined as an action set Aj, and the time-series data of the state s in the predetermined period is defined as a state set Sj.

Next, the CPU 112 uses the time-series data of the torque Trq and rotation speed NE to calculate the time-series data of an efficiency $\eta e$ of the internal combustion engine 10 and the motor generator 42 and the time-series data of a reference efficiency $\eta er$ (S52). The CPU 112 calculates the rotation speed NE using the output signal Scr of the crank angle sensor 84.

Specifically, when the torque of the motor generator 42 is zero, the CPU 112 calculates the efficiency $\eta e(k)$ and the reference efficiency $\eta er$ of the internal combustion engine 10 based on the operating point determined by the torque Trq(k) and the rotation speed NE(k), where k (1, 2, 3, . . . ) represents a sampling timing. The efficiency $\eta e$ is defined for each operating point of the internal combustion engine 10. The efficiency $\eta e$ is a proportion that can be taken as power in the combustion energy that occurs when the air-fuel ratio of the air-fuel mixture in the combustion chamber 24 of the internal combustion engine 10 is set as a predetermined value and the ignition timing is set as a predetermined timing. The reference efficiency $\eta er$ is defined for each output of the internal combustion engine 10. The reference efficiency $\eta er$ is a value obtained by multiplying, by a predetermined coefficient that is smaller than 1, the maximum value of the proportion that can be taken as power in the combustion energy that occurs when the air-fuel ratio of the air-fuel mixture in the combustion chamber 24 of the internal combustion engine 10 is set as the predetermined value and the ignition timing is set as the predetermined timing. That is, the reference efficiency $\eta er$ is a value obtained by multiplying, by the predetermined coefficient, the proportion that can be taken as power in the operating point where the proportion is the maximum. Specifically, for example, the CPU 112 obtains the efficiency $\eta e$ through map calculation when the ROM 114 stores the map data in which the torque and rotation speed NE of the internal combustion engine 10 are used as input variables and the efficiency $\eta e$ is used as an output variable. Further, for example, the CPU 112 obtains the reference efficiency $\eta er$ through map calculation when the ROM 114 stores the map data in which the output of the product of the torque and rotation speed NE of the internal combustion engine 10 is used as an input variable and the reference efficiency $\eta er$ is used as an output variable.

Likewise, when the clutch 40 is in the disengaged state, the CPU 112 calculates the efficiency $\eta e(k)$ using the operating point of the motor generator 42 determined by the torque Trq(k) and the rotation speed NE(k). The efficiency $\eta e(k)$ is calculated as a proportion of the motor generator 42 for the power input to the inverter 44. Further, the CPU 112 calculates the corresponding reference efficiency $\eta er$.

When the torque of the motor generator 42 is greater than zero in the HV mode, the CPU 112 calculates the torque of the motor generator 42 based on the currents iu, iv, iw, which flow through the motor generator 42. Further, the CPU 112 calculates the torque of the internal combustion engine 10 by subtracting the calculated torque of the motor generator 42 from the torque Trq. Then, the CPU 112 calculates an efficiency using the torque and rotation speed of the motor generator 42. The efficiency is a proportion of the motor generator 42 for the power input to the inverter 44. The CPU 112 calculates the efficiency of the internal combustion engine 10 based on the torque and rotation speed of the internal combustion engine 10 and calculates the efficiency $\eta e$ as the average value of the efficiency. Further, the CPU 112 calculates the corresponding reference efficiency $\eta er$.

Next, the CPU 112 calculates an integration value of a value obtained by subtracting 1 from a value obtained by dividing the efficiency $\eta e(k)$ by the reference efficiency $\eta er(k)$ and assigns, to a reward r, a value obtained by multiplying, by a coefficient K, the integration value (S54). This process causes the reward r to be larger when the efficiency $\eta e$ is higher than the reference efficiency $\eta er$ than when the efficiency $\eta e$ is lower than the reference efficiency $\eta er$.

The CPU 112 varies the coefficient K in correspondence with the specifying variable VU. Specifically, the coefficient K is set to a larger value when the specifying variable VU indicates the EV mode than when the specifying variable VU indicates the HV mode. This setting lowers the standard of the efficiency when a predetermined reward is provided in the EV mode. That is, the efficiency $\eta e$ is low when the same reward is obtained in the EV mode. Thus, when a high operating point is selected for the efficiency $\eta e$ in the EV mode, the value of the reward r becomes larger in the EV mode than in the HV mode.

Subsequently, the CPU 112 determines whether a condition (A) is met (S56). The condition (A) is that the absolute value of the difference between an arbitrary torque Trq and the requested torque command value Trqd* in the predetermined period is less than or equal to a specified amount $\Delta Trq$.

The CPU 112 variably sets the specified amount $\Delta Trq$ depending on a change amount per unit time $\Delta PA$ of the accelerator operation amount PA and the specifying variable at the start of the predetermined period. That is, the CPU 112 determines that the episode is related to transient time if the absolute value of the change amount per unit time $\Delta PA$ is great and sets the specified amount $\Delta Trq$ to a greater value than in a case in which the episode is related to steady time. Further, the CPU 112 sets the specified amount $\Delta Trq$ to be larger in the EV mode than in the HV mode.

When determining that the above-described absolute value is less than or equal to the specified amount $\Delta Trq$ (S56: YES), the CPU 112 adds K1–N to the reward r (S58). When determining that the above-described condition is not met (S56: NO), the CPU 72 subtracts K1·N from the reward r (S60). Here, n refers to the number of samplings of the efficiency ηe in the predetermined period. The processes from S56 to S60 provide a greater reward when a standard related to acceleration response is met than when the standard related to acceleration response is not met.

When the process of S58 or S60 is completed, the CPU 112 determines whether a condition (B) is met (S62). The condition (B) is that the maximum value of the accelerator operation amount PA in the predetermined period is greater than or equal to a threshold value PAth. The CPU 112 sets the threshold value PAth to be larger in the EV mode than in the HV mode. When determining that the condition (B) is met (S62: YES), the CPU 112 subtracts the reward r from K2·n (S64). That is, when the accelerator operation amount PA is excessively large, the user may feel that the torque is insufficient. Thus, a negative reward is assigned in order to impose a penalty.

When completing the process of S64 or making a negative determination in the process of S62, the CPU 112 updates the relationship defining data DR stored in the memory device 76 shown in FIG. 3. In the present embodiment, a ε-soft on-policy Monte Carlo method is used.

That is, the CPU 112 adds the reward r to respective returns R(Sj, Aj), which are determined by pairs of the states read through the process of S50 and actions corresponding to the respective states (S66). Here, R(Sj, Aj) collectively represents the returns R, each having one of the elements of the state set Sj as the state and one of the elements of the action set Aj as the action. Next, the CPU 112 averages each of the returns R(Sj, Aj), which are determined by pairs of the states and the corresponding actions read through the process of S50, and assigns the averaged return R(Sj, Aj) to the corresponding action value functions Q(Sj, Aj) (S68). The averaging simply needs to be a process that divides the return R, which is calculated through the process of S66, by the number of times the process S66 has been executed. The initial value of the return R simply needs to be 0.

Next, for each of the states read through the process of S50, the CPU 112 assigns, to an action Aj*, an action that maximizes the value of the action value function Q in the corresponding action value function Q(Sj, A) (S70). The sign A represents an arbitrary action that can be taken. The action Aj* can have different values depending on the type of the state read through the process of S50. In view of simplification, the action Aj* is described with the same sign.

Subsequently, the CPU 112 updates the policy 7E corresponding to each of the states read through the process of S50 (S72). That is, the CPU 112 sets the selection probability of the action Aj* selected through S70 to (1−ε)+ε/|A| where |A| represents the total number of actions. The number of the actions other than the action Aj* is represented by |A|−1. The CPU 112 sets the selection probability of each of the actions other than the action Aj* to ε/|A|. The process of S72 is based on the action value function Q that has been updated through the process of S70. Accordingly, the relationship defining data DR, which defines the relationship between the state s and the action a, is updated so as to increase the return R.

When the process of step S72 is completed, the CPU 112 suspends the series of processes shown in FIG. 5.

Referring back to FIG. 4, when the process of S42 is completed, the CPU 112 determines whether the action value function Q has converged (S44). The CPU 112 simply needs to determine that the action value function Q has converged when the number of times the amount of the action value function Q updated by the process of S44 successively becomes a predetermined value reaches a predetermined number of times. When determining that the action value function Q has not converged (S44: NO) or making a negative determination in the process of S40, the CPU 112 returns to the process of S32. When determining that the action value function Q has converged (S44: YES), the CPU 112 determines whether the CPU 112 has made an affirmative determination in the process of S44 both for the EV mode and the HV mode (S46).

When determining that one of the EV mode and the HV mode has not been set yet in the process of S44 (S46: NO), the CPU 112 returns to the process of S30 and sets the specifying variable VU. When making an affirmative determination in the process of S46, the CPU 112 suspends the series of processes shown in FIG. 4.

Figure 6:
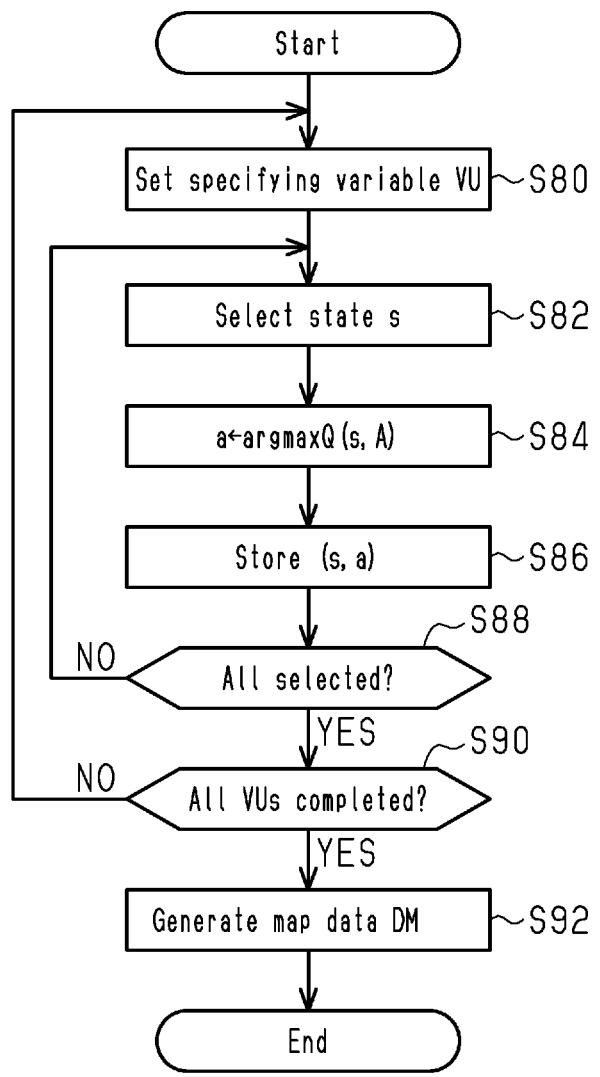
FIG. 6 is a flowchart illustrating a procedure for processes that generate the map data according to the first embodiment.

FIG. 6 shows a procedure for processes that, in particular, generate the map data DM in reference to the action value function Q learned by the process of FIG. 4, in the processes executed by the generation device 110. The processes shown in FIG. 6 are implemented by the CPU 112 executing the learning program 114a stored in the ROM 114.

In the series of processes shown in FIG. 6, the CPU 112 first sets the value of the specifying variable VU (S80). Then, the CPU 112 selects one of plural states s defined by the relationship defining data DR (S82). Next, the CPU 112 selects the action a that maximizes the value of one of the action value functions Q (s, A) that correspond to the states (S84). In S84, the action a is selected by a greedy policy. Subsequently, the CPU 112 causes the memory device 116 to store a set of the state s and the action a (S86).

Then, the CPU 112 determines whether all the values of the state s defined by the relationship defining data DR have been selected by the process of S82 (S88). When determining that there is a value that has not been selected (S88: NO), the CPU 112 returns to the process of S82. When determining that all the values have been selected (S88: YES), the CPU 112 determines whether all the values that can be taken as the value of the specifying variable VU have been set by the process of S80 (S90). When determining that there is a value that has not been set yet (S90: NO), the CPU 112 returns to the process of S80 and sets that value.

When determining that all the values have been set (S90: YES), the CPU 112 generates the EV map data DM1 and the HV map data DM2 (S92). In the map data DM, the value of the output variable corresponding to the value of the input variable, which is the state s, is set as the corresponding action a.

When the process of step S92 is completed, the CPU 112 suspends the series of processes shown in FIG. 6.

The operation and advantages of the present embodiment will now be described.

In the system shown in FIG. 3, the CPU 112 learns the action value function Q through reinforcement learning. When the value of the action value function Q converges, it means that an action suitable for meeting the standard required for the energy use efficiency and the standard required for the acceleration response has been learned. Then, for each of the states serving as the input variables of the map data DM, the CPU 112 selects an action that maximizes the action value function Q and stores a set of the state and action in the memory device 116. Next, the CPU 112 uses the set of the state and action stored in the memory device 116 to generate the map data DM. This allows a suitable gear ratio command value GR* to be set in correspondence with the accelerator operation amount PA, the vehicle speed Vs, and the gear ratio GR without excessively increasing the man-hours by skilled workers.

Particularly, in the present embodiment, the action a corresponding to each state s is learned depending on whether the EV mode or the HV mode is being executed. Specifically, a reward is provided such that the standard related to acceleration response is made looser and a high efficiency ηe is more advantageous in the EV mode than in the HV mode. Thus, during the learning of the relationship defining data DR in the EV mode, the reward obtained by the process of S58 can be obtained by meeting the condition (A) and condition (B) even if the acceleration response is set to be relatively low. Further, maximizing the efficiency ηe is advantageous to increase the total reward. Thus, the EV map data DM1 allows for control that increases the energy use efficiency and consequently increases the travel distance in the EV mode.

During the learning of the relationship defining data DR in the HV mode, the reward obtained by the process of S54 is small despite an increased efficiency ηe. Thus, obtaining the reward of the process of S58 by meeting the condition (A) and the condition (B) is advantageous to increase the total reward. Accordingly, the HV map data DM2 enables control with a favorable responsivity for the accelerator operation performed by the user.

The above-described present embodiment further provides the following operation and advantage.

(1) The memory device 76 of the controller 70 stores the map data DM instead of the action value function Q. In this case, the CPU 112 sets the gear ratio command value GR* based on the map calculation that uses the map data DM. This reduces the computation load as compared with when executing a process that selects one of the action value functions Q that has the maximum value.

Second Embodiment

A second embodiment will now be described with reference to the drawings, focusing on the differences from the first embodiment.

Figure 7:
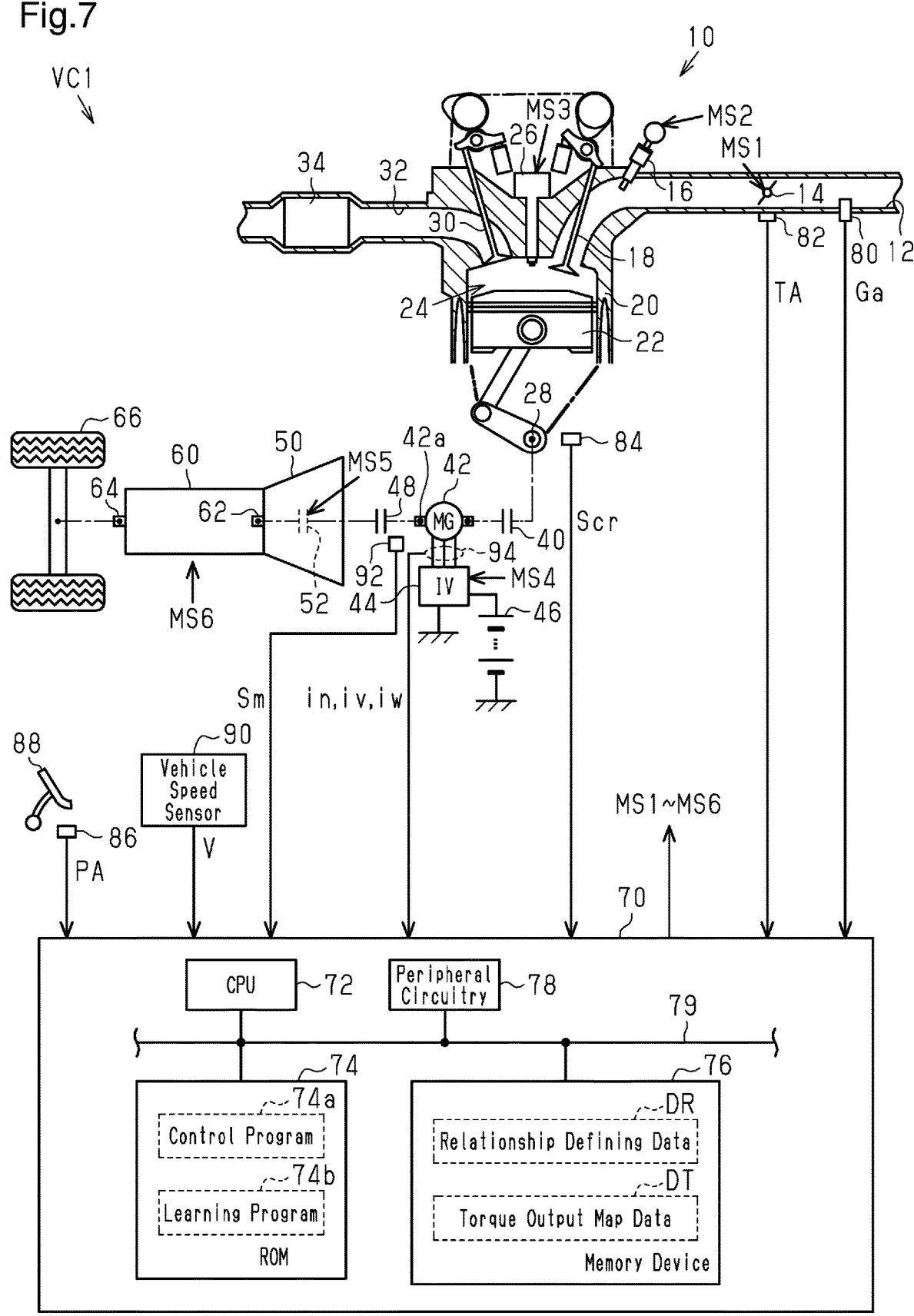
FIG. 7 is a diagram showing the controller and the drive system according to a second embodiment.

FIG. 7 shows the configuration of the drive system and the controller 70 of the vehicle VC1 according to the present embodiment. In FIG. 7, the same reference numerals are given to the components that are the same as those in FIG. 1 for illustrative purposes.

As shown in FIG. 7, in the present embodiment, the ROM 74 stores a learning program 74b in addition to the control program 74a. The memory device 76 stores the relationship defining data DR and torque output mapping data DT instead of the map data DM. The relationship defining data DR refers to pre-trained data that has been learned by the process of FIG. 4. In the relationship defining data DR, the state s includes the accelerator operation amount PA, the specifying variable VU, the vehicle speed Vs, and the gear ratio GR, and the action a includes the gear ratio command value GR*. The torque output map is defined by the torque output map data DT. The torque output map is related to, for example, a pre-trained model of a neural network that uses, as inputs, the rotation speed NE, the charging efficiency and the ignition timing and outputs the torque of the internal combustion engine 10. The torque output map data DT may be, for example, data that has been learned by using, as training data, the torque of the internal combustion engine 10 calculated based on the torque Trq obtained by the process of S38 when the processes of FIG. 4 are executed. The charging efficiency η may be calculated by the CPU 72 based on the rotation speed NE and the intake air amount Ga.

Figure 8:
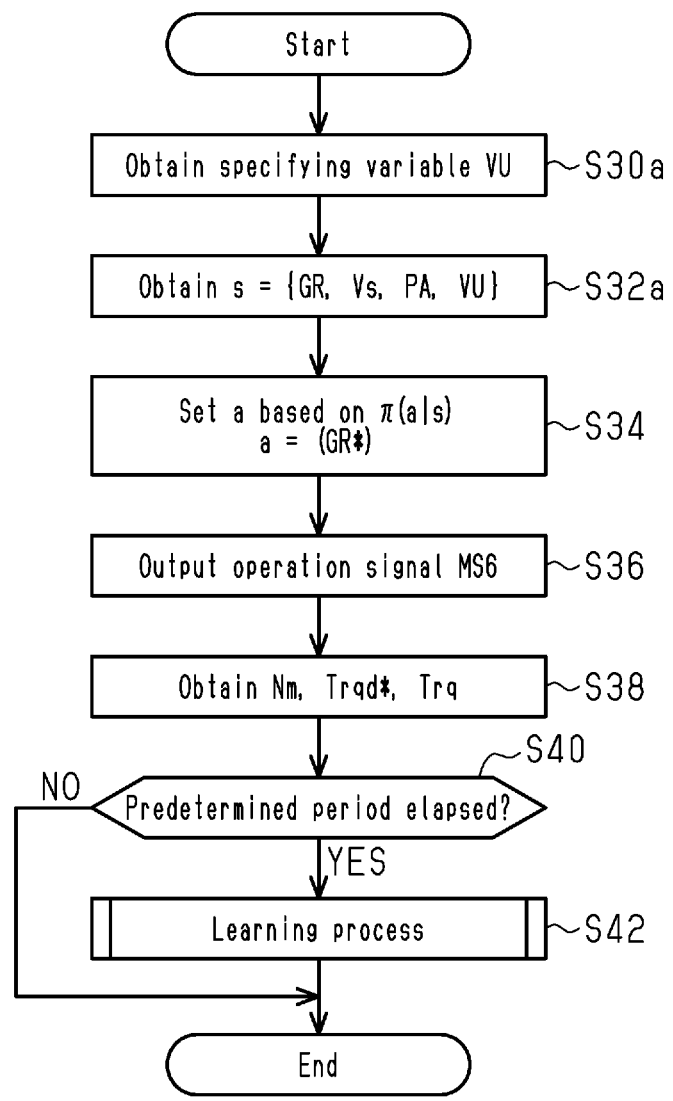
FIG. 8 is a flowchart illustrating a procedure for processes executed by the controller in FIG. 7.

FIG. 8 shows a procedure for processes executed by the controller 70 of the present embodiment. The processes shown in FIG. 8 are implemented by the CPU 72 repeatedly executing the control program 74a and the learning program 74b stored in the ROM 74, for example, in a predetermined cycle. In FIG. 8, the same step numbers are given to the processes that correspond to those in FIG. 4 for illustrative purposes.

In the series of processes shown in FIG. 8, the CPU 72 first obtains the specifying variable VU (S30a). Next, the CPU 72 obtains the accelerator operation amount PA, the specifying variable VU, the vehicle speed Vs, and the gear ratio GR as the state s (S32a) and executes the processes from S34 to S42 in FIG. 4. When making a negative determination in the process of S40 or completing the process of S42, the CPU 72 suspends the series of processes shown in FIG. 8. The processes of S30a, S32a, S34 to S40 are implemented by the CPU 72 executing the control program 74a, and the process of S42 is implemented by the CPU 72 executing the learning program 74b.

As described above, in the present embodiment, the relationship defining data DR and the learning program 74b are implemented in the controller 70. Accordingly, as compared with the first embodiment, the learning frequency improves.

Third Embodiment

A third embodiment will now be described with reference to the drawings, focusing on the differences from the second embodiment.

In the present embodiment, the relationship defining data DR is updated outside the vehicle VC1.

Figure 9:
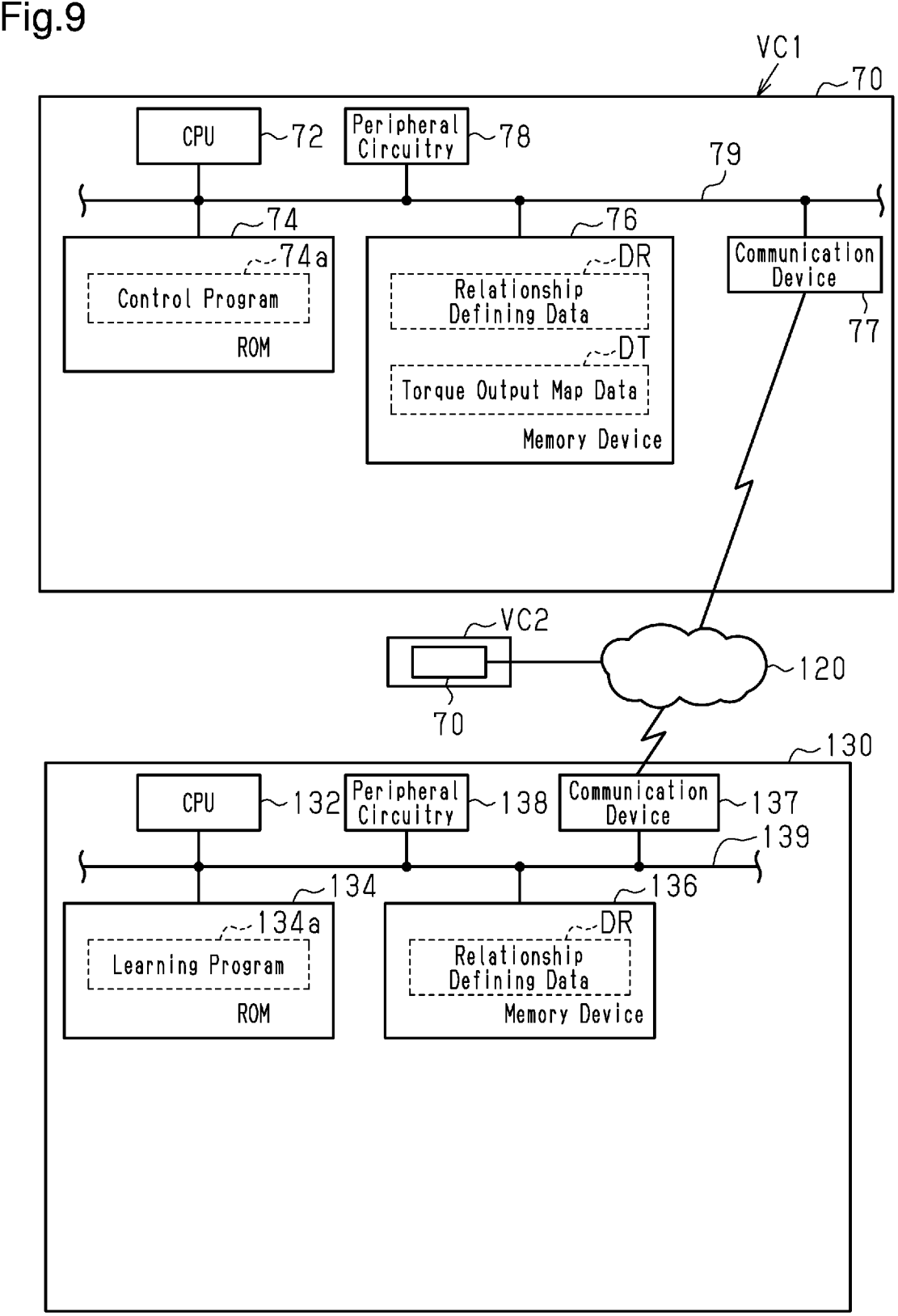
FIG. 9 is a diagram showing the configuration of the system according to a third embodiment.

FIG. 9 shows the configuration of a control system that executes reinforcement learning. In FIG. 9, the same reference numerals are given to the components that are the same as those in FIG. 1 for illustrative purposes.

The ROM 74 of the controller 70 in the vehicle VC1 shown in FIG. 9 stores the control program 74a, but does not store the learning program 74b. The controller 70 includes a communication device 77. The communication device 77 communicates with a data analysis center 130 via a network 120 outside the vehicle VC1.

The data analysis center 130 analyzes the data transmitted from vehicles VC1, VC2, . . . . The data analysis center 130 includes a CPU 132, a ROM 134, a memory device 136, peripheral circuitry 138, and a communication device 137, which can communicate with each other via a local network 139. The memory device 136 is, for example, an electrically-rewriteable nonvolatile memory. The ROM 134 stores a learning program 134a, and the memory device 136 stores the relationship defining data DR.

Figure 10A:
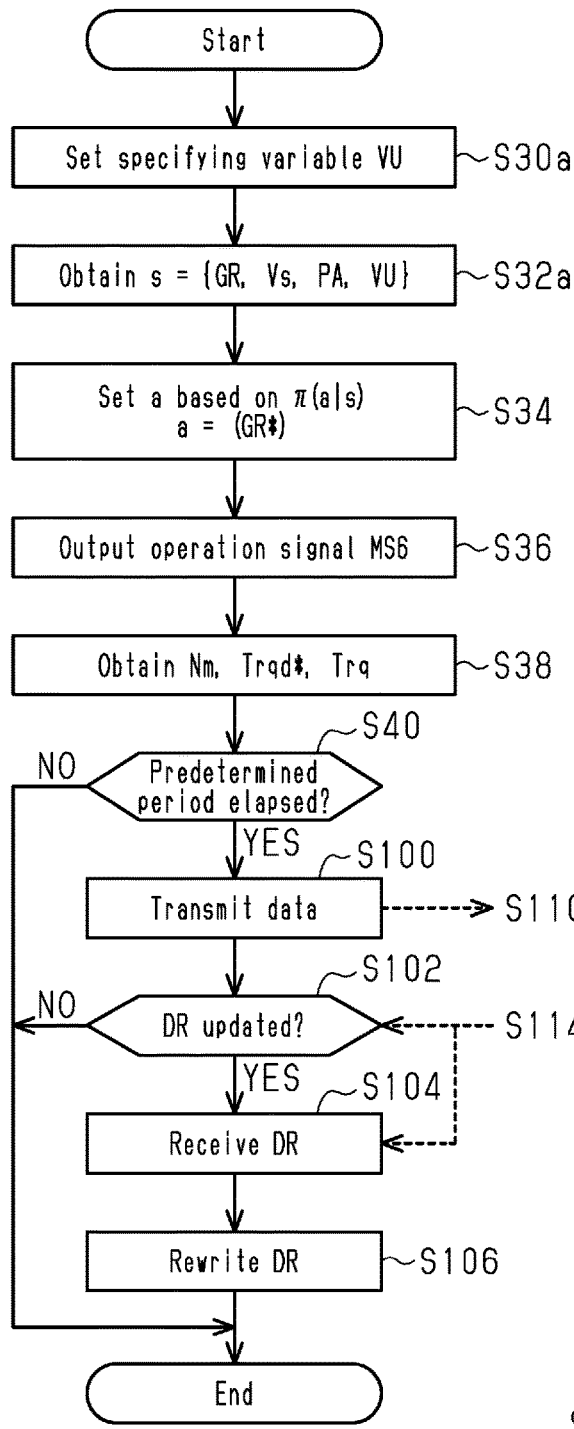
FIG. 10A is a flowchart illustrating a procedure for processes executed by the system according to the third embodiment.
Figure 10B:
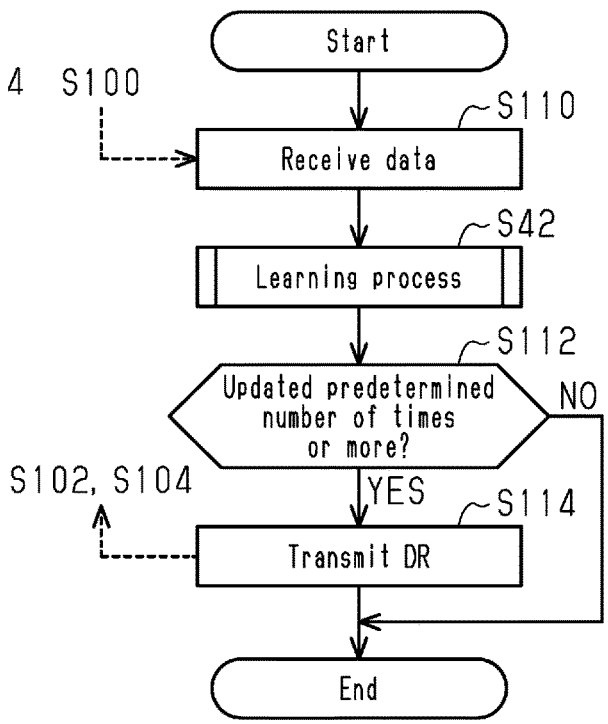
FIG. 10B is a flowchart illustrating a procedure for processes executed by the system according to the third embodiment.

FIGS. 10A and 10B show a procedure for processes of reinforcement learning according to the present embodiment. The processes shown in FIG. 10A are implemented by the CPU 72 executing the control program 74a stored in the ROM 74 shown in FIG. 9. The processes shown in FIG. 10B are implemented by the CPU 132 executing the learning program 134a stored in the ROM 134. In FIGS. 10A and 10B, the same step numbers are given to the processes that correspond to those in FIG. 8 for illustrative purposes. The processes shown in FIGS. 10A and 10B will now be described with reference to the temporal sequence of reinforcement learning.

In the series of processes shown in FIG. 10A, the CPU 72 first executes the processes of S30a, S32a, S34 to S38. When determining that the predetermined period has elapsed (S40:

YES), the CPU 72 operates the communication device 77 to transmit data necessary for the updating process of the relationship defining data DR (S100). The data subject to the transmission includes the value of the specifying variable VU in the predetermined period, the time-series data of the rotation speed NE, torque command value Trq*, and torque Trq, and the state set Sj and action set Aj.

As shown in FIG. 10B, the CPU 132 receives the transmitted data (S110), and updates the relationship defining data DR based on the received data (S42). The CPU 132 determines whether the relationship defining data DR is updated a predetermined number of times or more (S112). When determining that the update has been performed the predetermined number of times or more (S112: YES), the CPU 132 operates the communication device 137 to transmit the relationship defining data DR to the vehicle VC1 that has transmitted the data received through the process of S110 (S114). When completing the process of S114 or when making a negative determination in the process of S112, the CPU 132 suspends the series of processes shown in FIG. 10B.

As shown in the FIG. 10A, the CPU 72 determines whether there is updated data (S102). When determining that there is updated data (S102: YES), the CPU 72 receives the updated relationship defining data DR (S104). Then, the CPU 72 rewrites the relationship defining data DR used in the process of S34 to the received relationship defining data DR (S106). When completing the process of S106 or when making a negative determination in the process of S40, S102, the CPU 72 suspends the series of processes shown in FIG. 10A.

As described above, the present embodiment updates the relationship defining data DR outside the vehicle VC1. This reduces the computation load on the controller 70. Further, for example, in the process of S110, if the process of S42 is executed by receiving the data from multiple vehicles VC1, VC2, the number of data sets used for learning can be easily increased.

Correspondence

The correspondence between the items in the above-described embodiments and the items described in the above-described SUMMARY is as follows. Below, the correspondence is shown for each of the numbers in the examples described in the SUMMARY.

In Examples 1 and 2, the execution device corresponds to the CPU 72 and ROM 74 in FIG. 7, corresponds to the CPU 112 and ROM 114 in FIG. 3, and corresponds to the CPUs 72, 132 and ROMs 74, 134 in FIG. 9. The memory device in Examples 1 and 2 corresponds to the memory device 76 in FIG. 7, corresponds to the memory device 116 in FIG. 3, and corresponds to the memory devices 76, 136 in FIG. 9. The obtaining process corresponds to the processes of S30, S32, S38 in FIG. 4 or corresponds to the processes of S30a, S32a, S38 in FIGS. 8 and 10A. The operating process corresponds to the process of S36. The reward calculating process corresponds to the processes from S52 to S64. The updating process corresponds to the processes from S66 to S72. The update map corresponds to the map defined by the command that executes the processes from S66 to S72 in the learning program 74b. The changing process corresponds to the process that varies the coefficient K in correspondence with the specifying variable VU in the process of S54, the process that varies the specified amount ΔTrq in correspondence with the specifying variable VU in the process of S56, and the process that varies the threshold value PAth in correspondence with the specifying variable VU in the process of S62.

In Example 3, the control map data refers to the map data DM.

In Example 4, the execution device corresponds to the CPU 72 and ROM 74 in FIG. 7, and the memory device corresponds to the memory device 76 in FIG. 7.

[5-7] In Examples 5 to 7, the first execution device (first processing circuitry) corresponds to the CPU 72 and ROM 74, and the second execution device (second processing circuitry) corresponds to the CPU 132 and ROM 134.

Other Embodiments

The present embodiments may be modified as follows. The above-described embodiments and the following modifications can be combined as long as the combined modifications remain technically consistent with each other.

Regarding Specifying Variable

The specifying variable does not have to specify whether the EV mode or the HV mode, which uses at least the torque of the internal combustion engine 10 to generate the propelling force of the vehicle, is being executed. Instead, for example, the HV mode may be divided into two modes, namely, a mode that generates the propelling force of the vehicle using only the torque of the internal combustion engine 10 and a mode that generates the propelling force of the vehicle by combining the torque of the internal combustion engine 10 and the torque of the motor generator 42, and the specifying variable may identify three modes including these two modes and the EV mode.

Regarding Changing Process

In the process of S56, the specified amount ΔTrq is varied depending on whether the EV mode is being executed. Instead, for example, the coefficient K1 may be varied in the process of S58 or S60 depending on whether the EV mode is being executed. That is, for example, if the coefficient K1 is set to be small in the EV mode, meeting the condition (A) is not so advantageous to increase the total reward. This facilitates the learning of increasing the efficiency ηe.

In the process of S62, the threshold value PAth is varied depending on whether the EV mode is being executed. Instead, for example, the coefficient K2 may be varied in the process of S64 depending on whether the EV mode is being executed. That is, for example, if the coefficient K2 is set to be small in the EV mode, making a negative determination in the process of S62 is not so advantageous to increase the total reward. This facilitates the learning of increasing the efficiency ηe.

The CPU does not have to execute only one of the process that changes the standard related to acceleration response like the processes of S52, S62 and the process that changes the reward according to whether the standard related to acceleration response is met like in the above-described modification. Instead, the CPU may execute both of these processes.

For example, while varying the coefficient K in correspondence with the specifying variable VU in the process of S54, the CPU does not have to execute both the process that changes the standard related to acceleration response and the process that changes the reward according to whether the standard related to acceleration response is satisfied like in the above-described modification.

The purpose of the process that changes the manner of providing a reward between the EV mode and the HV mode is not limited to assigning top priority to increasing the energy use efficiency in the EV mode. Instead, for example, the standard related to acceleration response may be set to be higher in the EV mode than in the HV mode so as to emphasize a unique acceleration feel achieved by the rotating electric machine having a higher responsivity of torque than the internal combustion engine.

Regarding Relationship Defining Data

In the above-described embodiments, the action value function Q is a table-type function. Instead, for example, a function approximator may be used.

For example, instead of using the action value function Q, the policy 7C may be expressed by a function approximator that uses the state s and the action a as independent variables and uses the possibility that the action a will be taken as a dependent variable, and the parameters defined by the function approximator may be updated in correspondence with the reward r. In this case, different function approximators each corresponding to the value of the specifying variable VU may be provided. Further, for example, the specifying variable VU may be included in the state s serving as an independent variable of a single function approximator.

Regarding Operating Process

For example, when using a function approximator as the action value function Q as described in the Regarding Relationship Defining Data section, all the groups of discrete values related to actions that are independent variables of the table-type function of the above-described embodiments simply need to be input to the action value function Q together with the state s, so as to specify the action a that maximizes the action value function Q. In this case, for example, while the specified action a is mainly employed for operation, the other actions simply need to be selected at a predetermined probability.

For example, when the policy π is a function approximator that uses the state s and the action a as independent variables and uses the probability that the action a will be taken as a dependent variable as in the Regarding Relationship Defining Data section, the action a simply needs to be selected based on the probability indicated by the policy π.

Regarding Update Map

The ε-soft on-policy Monte Carlo method is executed in the process from S66 to S72. Instead, for example, an off-policy Monte Carlo method may be used. Also, methods other than Monte Carlo method may be used. For example, an off-policy TD method may be used. As another option, an on-policy TD method such as a SARSA method may be used. Alternatively, an eligibility trace method may be used as on-policy learning.

For example, when the policy π is expressed using a policy π and the policy π is directly updated based on the reward r as described in the Regarding Relationship Defining Data section, the update map simply needs to be constructed using, for example, a policy gradient method.

The present disclosure is not limited to the configuration in which only one of the action value function Q and the policy 7E is directly updated using the reward r. For example, the action value function Q and the policy 7E may be both updated as in an actor critic method. Further, in the actor critic method, for example, a value function V may be updated instead of the action value function Q.

Regarding Action Variable

For example, the action variable in the EV mode may include a torque command value of the motor generator 42, and the action variable in the HV mode may include a torque command value of the motor generator 42 and a torque command value of the internal combustion engine 10. Further, for example, a command value of the throttle opening degree TA may be used as the action variable instead of a torque command value of the internal combustion engine 10.

Additionally, when a command value of the throttle opening degree TA is included in the action variable instead of a torque command value of the internal combustion engine 10, a variable related to ignition timing or a variable related to air-fuel ratio may also be used as the action variable. Furthermore, for example, as described below in the Regarding Internal Combustion Engine section, in the case of a compression ignition internal combustion engine, a variable related to an injection amount simply needs to be used instead of the variable related to the opening degree of the throttle valve. In addition to the variable related to the injection timing, for example, it is possible to use a variable related to the number of times of injection within a single combustion cycle or use a variable related to the time interval between the ending point in time of one fuel injection and the starting point in time of the subsequent fuel injection for a single cylinder within a single combustion cycle.

When the lockup clutch 52 is subject to the operation corresponding to the action variable as described below in the Regarding Electronic Device section, the action variable simply needs to include a variable that indicates the engagement state of the lockup clutch 52. When the variable includes the engagement state of the lockup clutch 52, it is especially effective to change the engagement state of the lockup clutch 52, which serves as the value of the action variable, depending on the level of the priority of a request item indicating that the energy use efficiency is increased.

When the electronic device subject to operation corresponding to the action variable includes an in-vehicle air conditioner as described below in the Regarding Electronic Device section, the action variable simply needs to include the load torque of the compressor or the power consumption of the air conditioner.

Regarding State

The state may include the state of charge of the battery 46 or the temperature of the battery 46. Further, for example, when the action includes the load torque of the compressor or the power consumption of the air conditioner as described in the Regarding Action Variable section, the state may include the temperature in the passenger compartment.

Regarding Reward Calculating Process

The process that provides a greater reward when the energy use efficiency is high than when the energy use efficiency is low is not limited to the process that obtains the difference between the ratio of the reference efficiency to the efficiency of an actual operating point from 1. Instead, for example, a process that obtains the difference between the reference efficiency and the efficiency of an actual operating point may be employed.

For example, instead of providing the same reward without exception when the condition (A) is met, a process may be executed in which a greater reward is provided when the absolute value of the difference between the torque Trq and the requested torque command value Trqd* is small than when the absolute value is large. Also, instead of providing the same reward without exception when the condition (A) is not met, a process may be executed in which a smaller reward is provided when the absolute value of the difference between the torque Trq and the requested torque command value Trqd* is large than when the absolute value is small.

The process that provides a greater reward when the standard related to acceleration response is met than when the standard is not met is not limited to the process that provides a reward depending on the condition (A) is met and the process that provides a reward depending on the condition (B) is met. For example, in addition to the condition (A), a process may be executed that provides a reward depending on whether the longitudinal acceleration of the vehicle is in a predetermined range.

The reward calculating process does not have to include the process that provides a greater reward when the standard related to acceleration response is met than when the standard is not met and the process that provides a greater reward when the energy use efficiency meets the standard than when the energy use efficiency does not meet the standard. Instead, for example, the reward calculating process may include the process that provides a greater reward when the standard related to acceleration response is met than when the standard is not met and a process that provides a greater reward when the state in the passenger compartment meets a standard than when the state in the passenger compartment does not meet the standard. The process that provides a greater reward when the state in the passenger compartment meets the standard than when the state in the passenger compartment does not meet the standard may be, for example, a process that provides a greater reward when the vibration intensity of the vehicle is small than when the vibration intensity is large, such as a process that provides a greater reward when the vibration intensity of the vehicle is less than or equal to a predetermined value than when the vibration intensity is greater than the predetermined value. Alternatively, for example, a process may be provided that provides a greater reward when the intensity of noise in the vehicle is small than when the intensity is large, such as a process that provides a greater reward when the intensity of noise in the vehicle is less than or equal to a predetermined value than when the intensity is greater than the predetermined value.

The reward calculating process may include a process that provides a greater reward when the state of charge of the battery is within a predetermined range than when the state of charge is out of the predetermined range or a process that provides a greater reward when the temperature of the battery is within a predetermined range than when the temperature is out of the predetermined range.

For example, when the action variable includes the load torque of the compressor or the power consumption of the air conditioner as described in the Regarding Action Variable section, the reward calculating process may include a process that provides a greater reward when the temperature in the passenger compartment is within a predetermined range than when the temperature is out of the predetermined range. This process provides a greater reward when the state in the passenger compartment meets the standard than when the state in the passenger compartment does not meet the standard. Specifically, this process provides a greater reward when the comfort in the passenger compartment is high than when the comfort is low.

Regarding Vehicle Control Data Generation Method

In the process of S34 in FIG. 4, an action is determined based on the action value function Q. Instead, all the actions that are possibly taken may be selected at the same probability.

Regarding Control Map Data

The control map data that uses the state of the vehicle as an input and outputs the value of the action variable that maximizes the expected return by associating the state of the vehicle with the value of the action variable that maximizes the expected return one-on-one is not limited to map data. Instead, for example, a function approximator may be used. When, for example, the policy gradient method is used as described in the Regarding Update Map section above, the policy π is expressed with a Gaussian distribution indicating the probability of taking the values of the action variable and the average value is expressed by the function approximator. Then, the parameter of the function approximator that expresses the average value is updated to set the average value subsequent to learning as the control map data. That is, the average value output by the function approximator is regarded as the value of the action variable that maximizes the expected return. In this case, while a different function approximator may be provided for each of the values of the specifying variable VU, the state s of the independent variable of a single function approximator may include the specifying variable VU.

Regarding Electronic Device

The device of the driving system subject to operation corresponding to the action variable is not limited to the transmission 60 and may be, for example, the operation unit of the internal combustion engine 10. The operation unit of the internal combustion engine 10 may be, for example, the throttle valve 14. Instead of the throttle valve 14, the operation unit may be, for example, the ignition device 26 or the fuel injection valve 16. The driving system device subject to operation corresponding to the action variable may be, for example, the lockup clutch 52.

The electronic device subject to operation corresponding to the action variable is not limited to the electronic device of an in-vehicle driving system and may include, for example, an in-vehicle air conditioner. Even in this case, when, for example, the in-vehicle air conditioner is driven by the rotation power of the propelling force generator, the power supplied to the driven wheels in the power of the propelling force generator is dependent on the load torque of the in-vehicle air conditioner. Thus, for example, it is effective to include the load torque of the in-vehicle air conditioner in the action variable.

Regarding Vehicle Control System

In the processes of FIG. 10B, the processes of S42 are all executed in the data analysis center 130. Instead, for example, the processes from S66 to S72 may be executed in the data analysis center 130 without executing the reward-calculating processes from S52 to S64 so as to transmit the calculation result of the reward in the process of S100.

In the example shown in FIG. 10A, the process that determines an action based on the policy π (the process of S34) is executed by the vehicle. Instead, for example, the data obtained through the process of S32a may be transmitted from the vehicle VC1 to determine the action a in the data analysis center 130 using the transmitted data and transmit the determined action to the vehicle VC1.

The vehicle control system does not necessarily have to include the controller 70 and the data analysis center 130. For example, the data analysis center 130 may be replaced with a mobile terminal of the user. Also, the vehicle control system may include the controller 70, the data analysis center 130, and the mobile terminal. This is achieved by, for example, the portable terminal executing the process of S34.

Regarding Execution Device

The execution device is not limited to the device that includes the CPU 72 (112, 132) and the ROM 74 (114, 134) and executes software processing. For example, a hardware circuit (such as ASIC) may be provided that executes at least part of the software processes executed in the above-described embodiments. That is, the execution device may be modified as long as it has any one of the following configurations (a) to (c): (a) a configuration including a processor that executes all of the above-described processes according to programs and a program storage device such as a ROM that stores the programs; (b) a configuration including a processor and a program storage device that execute part of the above-described processes according to the programs and a dedicated hardware circuit that executes the remaining processes; and (c) a configuration including a dedicated hardware circuit that executes all of the above-described processes. Multiple software processing devices each including a processor and a program storage device or multiple dedicated hardware circuits may be provided. That is, the above-described processes may be executed in any manner as long as the processes are executed by processing circuitry that includes at least one of a set of one or more software processing circuits and a set of one or more dedicated hardware circuits.

Regarding Memory Device

In the above-described embodiments, the memory device storing the relationship defining data DR and the memory device (ROM 74, 114, 134) storing the learning program 74b, 114a, and the control program 74a are separate from each other. However, the present disclosure is not limited to this.

Regarding Hybrid Vehicle

The hybrid vehicle is not limited to a series-parallel hybrid vehicle and may be, for example, a series-parallel hybrid vehicle.

Regarding Internal Combustion Engine

The fuel injection valve of the internal combustion engine does not have to include a port injection valve that injects fuel into the intake passage 12 and may be a direct injection valve that injects fuel into the combustion chamber 24. Alternatively, the internal combustion engine may include both the port injection valve and the direct injection valve.

The internal combustion engine is not limited to a spark-ignition engine, but may be a compression ignition engine that uses, for example, light oil or the like.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A vehicle control data generation method, wherein a memory device stores relationship defining data that defines a relationship between a state of a vehicle including a rotating electric machine and an internal combustion engine and an action variable related to operation of an electronic device in the vehicle, the generation method comprising causing processing circuitry to execute:

an obtaining process that obtains time-series data of a specifying variable specifying whether an electric vehicle mode or a hybrid vehicle mode is being executed, the electric vehicle mode generating a state of the vehicle obtained based on a detection value of a sensor and generating a propelling force of the vehicle through only torque of the rotating electric machine, the hybrid vehicle mode causing torque of the internal combustion engine to contribute to the generation of the propelling force;

an operating process that operates the electronic device by outputting an operation signal based on the action variable;

a reward calculating process that provides, based on the time-series data of the state of the vehicle obtained by the obtaining process, a greater reward when a characteristic of the vehicle meets a standard than when the characteristic of the vehicle does not meet the standard; and an updating process that updates the relationship defining data by inputting, to a predetermined update map, the time-series data of the state of the vehicle obtained by the obtaining process, a value of the action variable used to operate the electronic device, and the reward corresponding to the operation of the electronic device, the update map outputs the updated relationship defining data so as to increase an expected return for the reward in a case where the electronic device is operated in accordance with the relationship defining data, and the reward calculating process includes a changing process that changes a reward provided when the electric vehicle mode is being executed and the characteristic of the vehicle is a predetermined characteristic such that the provided reward differs from a reward provided when the hybrid vehicle mode is being executed the characteristic of the vehicle is the predetermined characteristic.

2. The vehicle control data generation method according to claim 1, wherein the reward calculating process includes a process that provides a greater reward when an energy use efficiency is high than when the energy use efficiency is low, and the changing process includes a process that changes the reward such that increasing the energy use efficiency is more advantageous to obtain a great reward in the electric vehicle mode than in the hybrid vehicle mode.

3. The vehicle control data generation method according to claim 1, further comprising causing the processing circuitry to execute a process that generates control map data, based on the relationship defining data updated by the updating process, by associating the state of the vehicle with the value of the action variable that maximizes the expected return, the control map data using the state of the vehicle as an input and outputting the value of the action variable that maximizes the expected return.

4. A controller for a vehicle including a rotating electric machine and an internal combustion engine, the controller comprising:

a memory device configured to store relationship defining data that defines a relationship between a state of the vehicle and an action variable related to operation of an electronic device in the vehicle; and processing circuitry, wherein the processing circuitry is configured to execute:

an obtaining process that obtains time-series data of a specifying variable specifying whether an electric vehicle mode or a hybrid vehicle mode is being executed, the electric vehicle mode generating a state of the vehicle obtained based on a detection value of a sensor and generating a propelling force of the vehicle through only torque of the rotating electric machine, the hybrid vehicle mode causing torque of the internal combustion engine to contribute to the generation of the propelling force;

an operating process that operates the electronic device by outputting an operation signal based on the action variable;

a reward calculating process that provides, based on the time-series data of the state of the vehicle obtained by the obtaining process, a greater reward when a characteristic of the vehicle meets a standard than when the characteristic of the vehicle does not meet the standard; and an updating process that updates the relationship defining data by inputting, to a predetermined update map, the time-series data of the state of the vehicle obtained by the obtaining process, a value of the action variable used to operate the electronic device, and the reward corresponding to the operation of the electronic device, the update map outputs the updated relationship defining data so as to increase an expected return for the reward in a case where the electronic device is operated in accordance with the relationship defining data, the reward calculating process includes a changing process that changes a reward provided when the electric vehicle mode is being executed and the characteristic of the vehicle is a predetermined characteristic such that the provided reward differs from a reward provided when the hybrid vehicle mode is being executed the characteristic of the vehicle is the predetermined characteristic, and the operating process includes a process that operates, based on the relationship defining data, the electronic device in accordance with the value of the action variable corresponding to the state of vehicle.

5. A control system for a vehicle including a rotating electric machine and an internal combustion engine, the control system comprising:

a memory device configured to store relationship defining data that defines a relationship between a state of the vehicle and an action variable related to operation of an electronic device in the vehicle; and processing circuitry, wherein the processing circuitry is configured to execute:

an obtaining process that obtains time-series data of a specifying variable specifying whether an electric vehicle mode or a hybrid vehicle mode is being executed, the electric vehicle mode generating a state of the vehicle obtained based on a detection value of a sensor and generating a propelling force of the vehicle through only torque of the rotating electric machine, the hybrid vehicle mode causing torque of the internal combustion engine to contribute to the generation of the propelling force;

an operating process that operates the electronic device by outputting an operation signal based on the action variable;

a reward calculating process that provides, based on the time-series data of the state of the vehicle obtained by the obtaining process, a greater reward when a characteristic of the vehicle meets a standard than when the characteristic of the vehicle does not meet the standard; and an updating process that updates the relationship defining data by inputting, to a predetermined update map, the time-series data of the state of the vehicle obtained by the obtaining process, a value of the action variable used to operate the electronic device, and the reward corresponding to the operation of the electronic device, the update map outputs the updated relationship defining data so as to increase an expected return for the reward in a case where the electronic device is operated in accordance with the relationship defining data, the reward calculating process includes a changing process that changes a reward provided when the electric vehicle mode is being executed and the characteristic of the vehicle is a predetermined characteristic such that the provided reward differs from a reward provided when the hybrid vehicle mode is being executed the characteristic of the vehicle is the predetermined characteristic, the operating process includes a process that operates, based on the relationship defining data, the electronic device in accordance with the value of the action variable corresponding to the state of vehicle, the processing circuitry includes a first processing circuitry mounted on the vehicle and a second processing circuitry that differs from an in-vehicle device, the first processing circuitry is configured to execute at least the obtaining process and the operating process, and the second processing circuitry is configured to execute at least the updating process.

6. A vehicle controller, comprising the first processing circuitry of the vehicle control system according to claim 5.

7. A vehicle learning device, comprising the second processing circuitry of the vehicle control system according to claim 5.

* * * * *